United States Patent
Albero et al.

(10) Patent No.: US 12,461,776 B2
(45) Date of Patent: Nov. 4, 2025

(54) SYSTEM AND METHOD FOR IMPLEMENTING TIME-RESTRICTED ACCESS CONTROL TO ELECTRONIC DIGITAL RESOURCES

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 614 days.

(21) Appl. No.: 17/867,376

(22) Filed: Jul. 18, 2022

(65) Prior Publication Data

US 2024/0020151 A1 Jan. 18, 2024

(51) Int. Cl.
| | |
|---|---|
| G06F 9/46 | (2006.01) |
| G06F 9/30 | (2018.01) |
| G06F 9/50 | (2006.01) |
| G06F 21/10 | (2013.01) |
| H04L 9/40 | (2022.01) |

(52) U.S. Cl.
CPC ........... *G06F 9/468* (2013.01); *G06F 9/3012* (2013.01); *G06F 9/5027* (2013.01); *G06F 21/1076* (2023.08); *H04L 63/108* (2013.01)

(58) Field of Classification Search
CPC ...... G06F 9/468; G06F 9/3012; G06F 9/5027; G06F 21/1076; G06F 21/6218; H04L 63/108

See application file for complete search history.

(56) References Cited

U.S. PATENT DOCUMENTS

| | | | |
|---|---|---|---|
| 9,491,564 B1 | 11/2016 | Raleigh | |
| 9,529,998 B2 | 12/2016 | O'Hare | |
| 9,589,148 B2 | 3/2017 | O'Hare | |
| 9,785,785 B2 | 10/2017 | O'Hare | |
| 9,805,179 B2 | 10/2017 | McEwen | |
| 9,898,601 B2 | 2/2018 | Patel | |
| 9,923,918 B2 | 3/2018 | Nicodemus | |
| 9,923,927 B1 | 3/2018 | Mcclintock | |
| 10,248,657 B2 | 4/2019 | Prahlad | |
| 10,326,745 B2 | 6/2019 | Basin | |
| 10,356,062 B2 | 7/2019 | Roth | |
| 10,402,546 B1 | 9/2019 | Qureshi | |
| 10,628,597 B2 | 4/2020 | Berger | |
| 10,630,501 B2 | 4/2020 | Ansari | |
| 10,924,517 B2 | 2/2021 | Epple | |
| 11,277,395 B2 | 3/2022 | Leblond | |
| 11,367,343 B2 | 6/2022 | Davis | |
| 11,397,903 B2 | 7/2022 | Ives-Halperin | |

(Continued)

*Primary Examiner* — Tod R Swann
(74) *Attorney, Agent, or Firm* — Moore & Van Allen PLLC; Nicholas C. Russell

(57) ABSTRACT

A system is provided for implementing time-restricted access control to electronic digital resources. In some embodiments, the custom set of executable code used to generate the digital resource may provide granular control over access restrictions for accessing, viewing, and/or transferring the digital resource. Such access restrictions may include time duration restrictions, access frequency restrictions, data quality restrictions, and/or the like. In this way, the system may limit access to the digital resource in a secure manner.

20 Claims, 9 Drawing Sheets

(56) References Cited

U.S. PATENT DOCUMENTS

| | | | |
|---|---|---|---|
| 11,418,344 B1* | 8/2022 | Foley | H04L 9/50 |
| 2018/0316676 A1 | 11/2018 | Gilpin | |
| 2019/0253399 A1 | 8/2019 | Humphries | |
| 2020/0090433 A1 | 3/2020 | Johnson | |
| 2022/0309491 A1* | 9/2022 | Shapiro | G06F 21/64 |
| 2022/0366486 A1* | 11/2022 | Mccoy | H04L 9/3239 |
| 2022/0407702 A1* | 12/2022 | Jakobsson | H04L 9/50 |

* cited by examiner

SYSTEM AND METHOD FOR IMPLEMENTING TIME-RESTRICTED ACCESS CONTROL TO ELECTRONIC DIGITAL RESOURCES

FIELD OF THE INVENTION

The present invention embraces a system for implementing time-restricted access control to electronic digital resources.

BACKGROUND

There is a need for an efficient way to control digital resources within a network.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for implementing transfer and access restrictions on electronic digital resources. In particular, the system may generate a digital resource on a distributed electronic data register using a custom set of executable code. Using the custom set of code, the generated digital resource may in some embodiments be an access restricted resource that may be controlled by one or more access and/or transfer restrictions. Accordingly, the system may require a user to provide valid authentication credentials in order to access and/or transfer the digital resource. In this way, the system may prevent the misuse of digital resource stored within the network environment.

Accordingly, embodiments of the present disclosure provide a system for implementing transfer and access restrictions on electronic digital resources, the system comprising at least one non-transitory storage device; and at least one processor coupled to the at least one non-transitory storage device, wherein the at least one processor is configured to generate, using a customized set of executable code, a digital resource, wherein the customized set of executable code comprises one or more access controls associated with the digital resource, wherein the digital resource is stored on one or more computing nodes within a distributed register; receive, from an endpoint device, a request to execute one or more actions on the digital resource, wherein the request comprises an identifier associated with the endpoint device and a set of authentication credentials associated with the endpoint device; access an authorized cryptographic address database, wherein the authorized cryptographic addresses database comprises one or more entries for trusted cryptographic addresses within a network; validate the request based on the set of authentication credentials, the one or more access controls, and searching the authorized endpoint device database based on the identifier for the endpoint device; and based on validating the request, process the request according to the one or more access controls, wherein the one or more access controls comprises a transfer-based restriction on the digital resource.

In some embodiments, the digital resource is a non-fungible token, wherein the request to execute one or more actions comprises a request to transfer ownership of the non-fungible token from an owner to a recipient, wherein transferring ownership comprises changing a parameter associated with ownership of the non-fungible token from a first cryptographic address associated with the owner to a second cryptographic address associated with the recipient.

In some embodiments, processing the request according to the one or more access controls comprises detecting that the transfer-based restriction prevents transfer of the digital resource; and automatically blocking the request to transfer ownership.

In some embodiments, processing the request according to the one or more access controls comprises detecting that the transfer-based restriction limits transfer of the non-fungible token to authorized recipients; detecting a match between the second cryptographic address and an entry within the authorized cryptographic address database; and based on detecting the match, authorizing the request to transfer ownership.

In some embodiments, processing the request according to the one or more access controls comprises detecting that the transfer-based restriction limits transfer of the non-fungible token to authorized recipients; detecting no matches between the second cryptographic address and entries within the authorized cryptographic address database; and based on detecting no matches, automatically blocking the request to transfer ownership.

In some embodiments, validating the request comprises detecting that the endpoint device is authorized to access a private distributed register, wherein the digital resource is stored on the private distributed register; and based on detecting that the endpoint device is authorized to access the private distributed register, authorizing the request.

In some embodiments, the customized set of executable code is a customized smart contract for generating the digital resource.

Embodiments of the present disclosure also provide a computer program product for implementing transfer and access restrictions on electronic digital resources, the computer program product comprising a non-transitory computer-readable medium comprising code causing an apparatus to generate, using a customized set of executable code, a digital resource, wherein the customized set of executable code comprises one or more access controls associated with the digital resource, wherein the digital resource is stored on one or more computing nodes within a distributed register; receive, from an endpoint device, a request to execute one or more actions on the digital resource, wherein the request comprises an identifier associated with the endpoint device and a set of authentication credentials associated with the endpoint device; access an authorized cryptographic address database, wherein the authorized cryptographic addresses database comprises one or more entries for trusted cryptographic addresses within a network; validate the request based on the set of authentication credentials, the one or more access controls, and searching the authorized endpoint device database based on the identifier for the endpoint device; and based on validating the request, process the request according to the one or more access controls, wherein the one or more access controls comprises a transfer-based restriction on the digital resource.

In some embodiments, the digital resource is a non-fungible token, wherein the request to execute one or more actions comprises a request to transfer ownership of the non-fungible token from an owner to a recipient, wherein transferring ownership comprises changing a parameter associated with ownership of the non-fungible token from a first cryptographic address associated with the owner to a second cryptographic address associated with the recipient.

In some embodiments, processing the request according to the one or more access controls comprises detecting that the transfer-based restriction prevents transfer of the digital resource; and automatically blocking the request to transfer ownership.

In some embodiments, processing the request according to the one or more access controls comprises detecting that the transfer-based restriction limits transfer of the non-fungible token to authorized recipients; detecting a match between the second cryptographic address and an entry within the authorized cryptographic address database; and based on detecting the match, authorizing the request to transfer ownership.

In some embodiments, processing the request according to the one or more access controls comprises detecting that the transfer-based restriction limits transfer of the non-fungible token to authorized recipients; detecting no matches between the second cryptographic address and entries within the authorized cryptographic address database; and based on detecting no matches, automatically blocking the request to transfer ownership.

In some embodiments, validating the request comprises detecting that the endpoint device is authorized to access a private distributed register, wherein the digital resource is stored on the private distributed register; and based on detecting that the endpoint device is authorized to access the private distributed register, authorizing the request.

Embodiments of the present disclosure also provide a computer-implemented method for implementing transfer and access restrictions on electronic digital resources, the computer-implemented method comprising generating, using a customized set of executable code, a digital resource, wherein the customized set of executable code comprises one or more access controls associated with the digital resource, wherein the digital resource is stored on one or more computing nodes within a distributed register; receiving, from an endpoint device, a request to execute one or more actions on the digital resource, wherein the request comprises an identifier associated with the endpoint device and a set of authentication credentials associated with the endpoint device; accessing an authorized cryptographic address database, wherein the authorized cryptographic addresses database comprises one or more entries for trusted cryptographic addresses within a network; validating the request based on the set of authentication credentials, the one or more access controls, and searching the authorized endpoint device database based on the identifier for the endpoint device; and based on validating the request, processing the request according to the one or more access controls, wherein the one or more access controls comprises a transfer-based restriction on the digital resource.

In some embodiments, the digital resource is a non-fungible token, wherein the request to execute one or more actions comprises a request to transfer ownership of the non-fungible token from an owner to a recipient, wherein transferring ownership comprises changing a parameter associated with ownership of the non-fungible token from a first cryptographic address associated with the owner to a second cryptographic address associated with the recipient.

In some embodiments, processing the request according to the one or more access controls comprises detecting that the transfer-based restriction prevents transfer of the digital resource; and automatically blocking the request to transfer ownership.

In some embodiments, processing the request according to the one or more access controls comprises detecting that the transfer-based restriction limits transfer of the non-fungible token to authorized recipients; detecting a match between the second cryptographic address and an entry within the authorized cryptographic address database; and based on detecting the match, authorizing the request to transfer ownership.

In some embodiments, processing the request according to the one or more access controls comprises detecting that the transfer-based restriction limits transfer of the non-fungible token to authorized recipients; detecting no matches between the second cryptographic address and entries within the authorized cryptographic address database; and based on detecting no matches, automatically blocking the request to transfer ownership.

In some embodiments, validating the request comprises detecting that the endpoint device is authorized to access a private distributed register, wherein the digital resource is stored on the private distributed register; and based on detecting that the endpoint device is authorized to access the private distributed register, authorizing the request.

In some embodiments, the customized set of executable code is a customized smart contract for generating the digital resource.

A system is further provided for implementing time-restricted access control to electronic digital resources. In some embodiments, the custom set of executable code used to generate the digital resource may provide granular control over access restrictions for accessing, viewing, and/or transferring the digital resource. Such access restrictions may include time duration restrictions, access frequency restrictions, data quality restrictions, and/or the like. In this way, the system may limit access to the digital resource in a secure manner.

Accordingly, embodiments of the present disclosure provide a system for implementing time-restricted access control to electronic digital resources, the system comprising at least one non-transitory storage device; and at least one processor coupled to the at least one non-transitory storage device, wherein the at least one processor is configured to generate, using a customized set of executable code, a digital resource, wherein the customized set of executable code comprises one or more access restrictions associated with the digital resource, wherein the digital resource is stored on one or more computing nodes within a distributed register; receive, from an endpoint device, a request to access the digital resource, wherein the request comprises an identifier for the endpoint device and a set of authentication credentials associated with the endpoint device; provide limited access to the digital resource to the endpoint device according to one or more parameters associated with the one or more access restrictions, wherein the one or more access restrictions comprises a time-based access restriction; detect that the endpoint device has exceeded at least one of the one or more parameters associated with the one or more access restrictions; and automatically revoke access rights of the endpoint device to the digital resource.

In some embodiments, the time-based access restriction comprises a duration-based restriction, wherein the one or more parameters comprises a duration parameter for specifying a time limit for accessing the digital resource.

In some embodiments, detecting that the endpoint device has exceeded at least one of the one or more parameters comprises detecting that a time elapsed for endpoint device accessing the digital resource has exceeded a time limit specified by the duration parameter.

In some embodiments, the one or more access restrictions further comprises a frequency-based access restriction, wherein the one or more parameters comprises a frequency parameter for defining a number of times that the digital resource may be accessed by the endpoint device.

In some embodiments, detecting that the endpoint device has exceeded at least one of the one or more parameters comprises detecting that a number of times that the endpoint device has accessed the digital resource has exceeded a frequency limit specified by the frequency parameter.

In some embodiments, the one or more access restrictions further comprises a content-based access restriction, wherein the one or more parameters comprises at least one of a resolution parameter or bitrate parameter.

In some embodiments, revoking the access rights of the endpoint device comprises blocking future access requests from the endpoint device.

Embodiments of the present disclosure also provide a computer program product for implementing time-restricted access control to electronic digital resources, the computer program product comprising a non-transitory computer-readable medium comprising code causing an apparatus to generate, using a customized set of executable code, a digital resource, wherein the customized set of executable code comprises one or more access restrictions associated with the digital resource, wherein the digital resource is stored on one or more computing nodes within a distributed register; receive, from an endpoint device, a request to access the digital resource, wherein the request comprises an identifier for the endpoint device and a set of authentication credentials associated with the endpoint device; provide limited access to the digital resource to the endpoint device according to one or more parameters associated with the one or more access restrictions, wherein the one or more access restrictions comprises a time-based access restriction; detect that the endpoint device has exceeded at least one of the one or more parameters associated with the one or more access restrictions; and automatically revoke access rights of the endpoint device to the digital resource.

In some embodiments, the time-based access restriction comprises a duration-based restriction, wherein the one or more parameters comprises a duration parameter for specifying a time limit for accessing the digital resource.

In some embodiments, detecting that the endpoint device has exceeded at least one of the one or more parameters comprises detecting that a time elapsed for endpoint device accessing the digital resource has exceeded a time limit specified by the duration parameter.

In some embodiments, the one or more access restrictions further comprises a frequency-based access restriction, wherein the one or more parameters comprises a frequency parameter for defining a number of times that the digital resource may be accessed by the endpoint device.

In some embodiments, detecting that the endpoint device has exceeded at least one of the one or more parameters comprises detecting that a number of times that the endpoint device has accessed the digital resource has exceeded a frequency limit specified by the frequency parameter.

In some embodiments, the one or more access restrictions further comprises a content-based access restriction, wherein the one or more parameters comprises at least one of a resolution parameter or bitrate parameter.

Embodiments of the present disclosure also provide a computer-implemented method for implementing time-restricted access control to electronic digital resources, the computer-implemented method comprising generating, using a customized set of executable code, a digital resource, wherein the customized set of executable code comprises one or more access restrictions associated with the digital resource, wherein the digital resource is stored on one or more computing nodes within a distributed register; receiving, from an endpoint device, a request to access the digital resource, wherein the request comprises an identifier for the endpoint device and a set of authentication credentials associated with the endpoint device; providing limited access to the digital resource to the endpoint device according to one or more parameters associated with the one or more access restrictions, wherein the one or more access restrictions comprises a time-based access restriction; detecting that the endpoint device has exceeded at least one of the one or more parameters associated with the one or more access restrictions; and automatically revoking access rights of the endpoint device to the digital resource.

In some embodiments, the time-based access restriction comprises a duration-based restriction, wherein the one or more parameters comprises a duration parameter for specifying a time limit for accessing the digital resource.

In some embodiments, detecting that the endpoint device has exceeded at least one of the one or more parameters comprises detecting that a time elapsed for endpoint device accessing the digital resource has exceeded a time limit specified by the duration parameter.

In some embodiments, the one or more access restrictions further comprises a frequency-based access restriction, wherein the one or more parameters comprises a frequency parameter for defining a number of times that the digital resource may be accessed by the endpoint device.

In some embodiments, detecting that the endpoint device has exceeded at least one of the one or more parameters comprises detecting that a number of times that the endpoint device has accessed the digital resource has exceeded a frequency limit specified by the frequency parameter.

In some embodiments, the one or more access restrictions further comprises a content-based access restriction, wherein the one or more parameters comprises at least one of a resolution parameter or bitrate parameter.

In some embodiments, revoking the access rights of the endpoint device comprises blocking future access requests from the endpoint device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
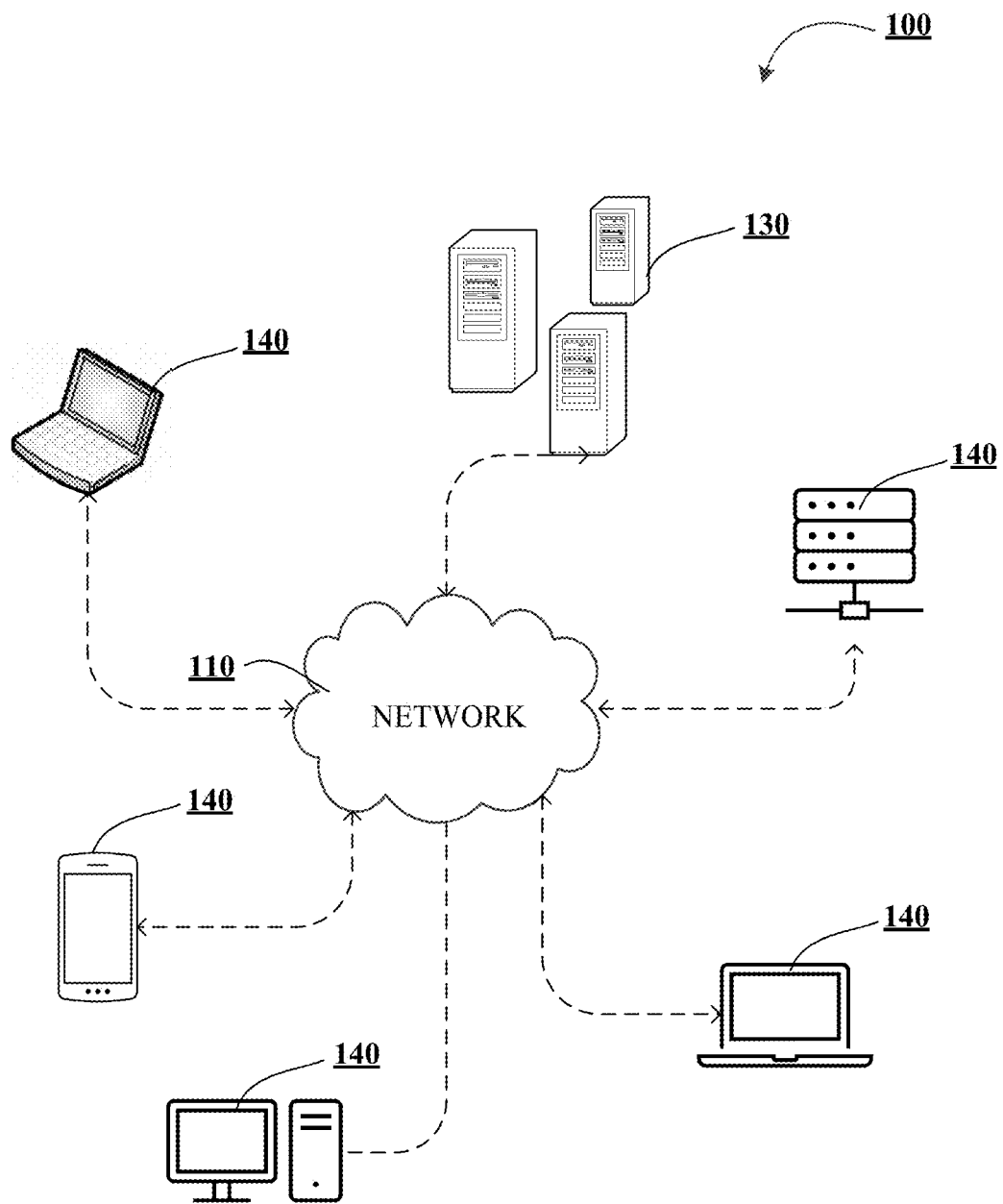
Figure 1B:
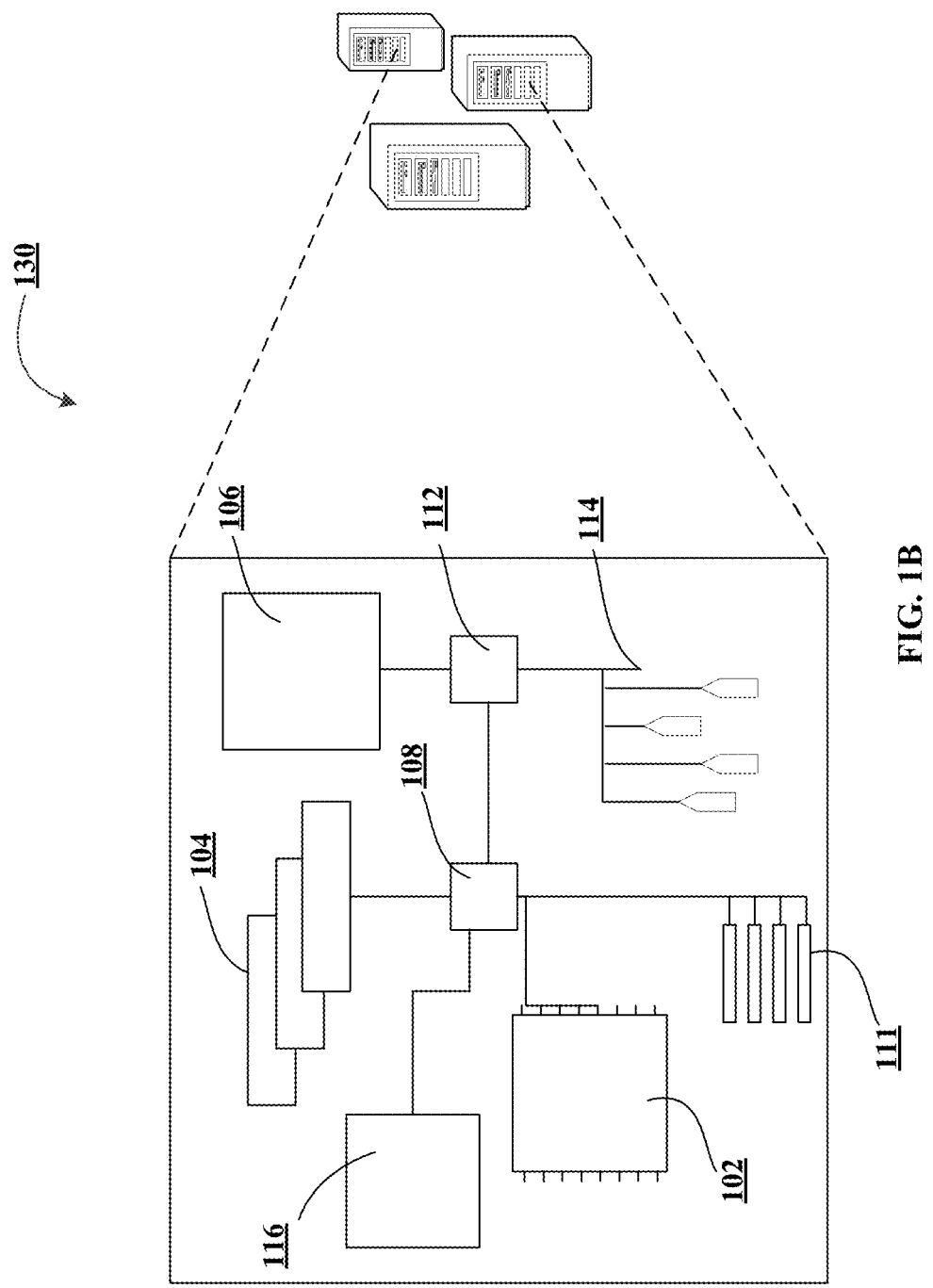
Figure 1C:
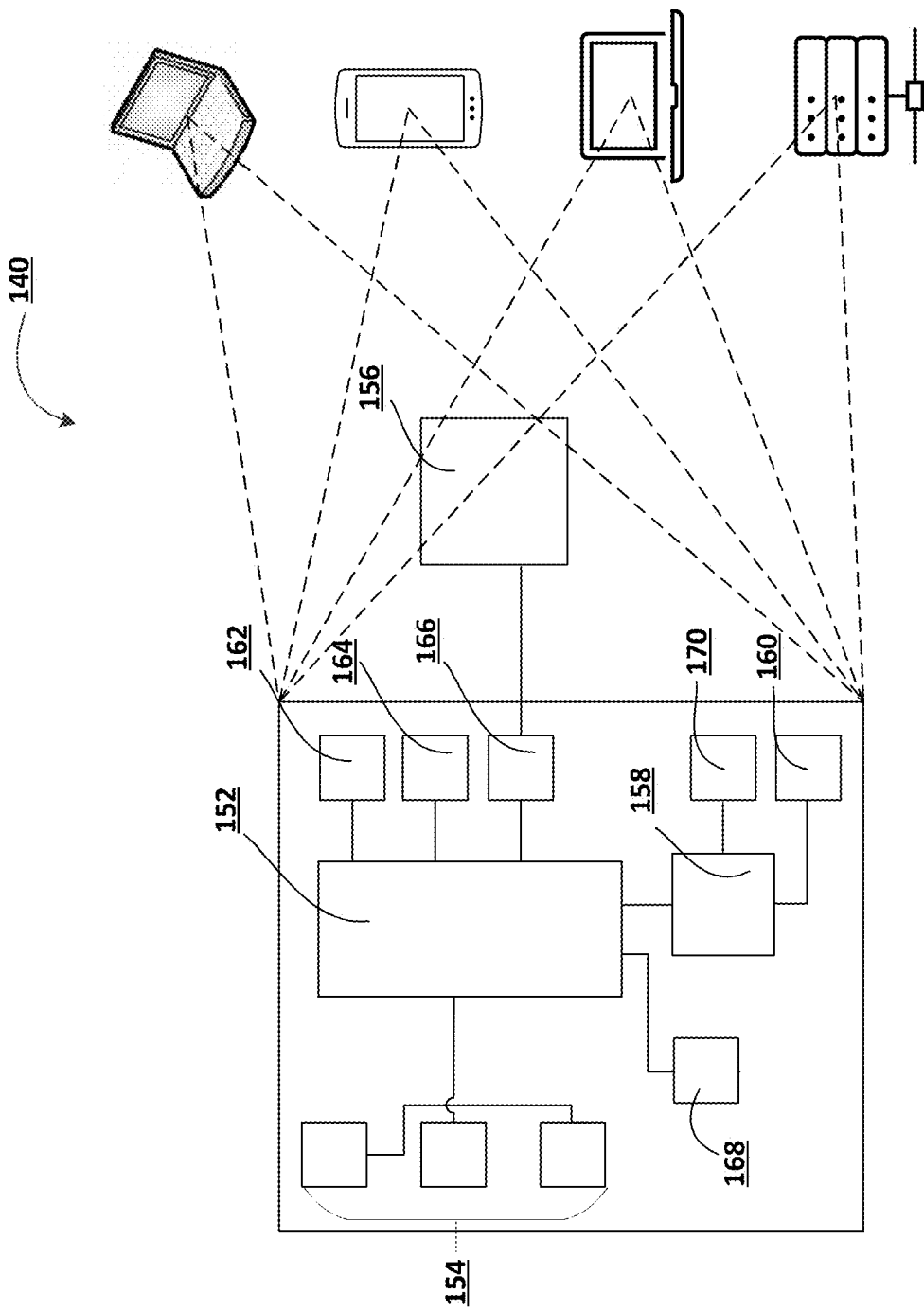
Figure 2A:
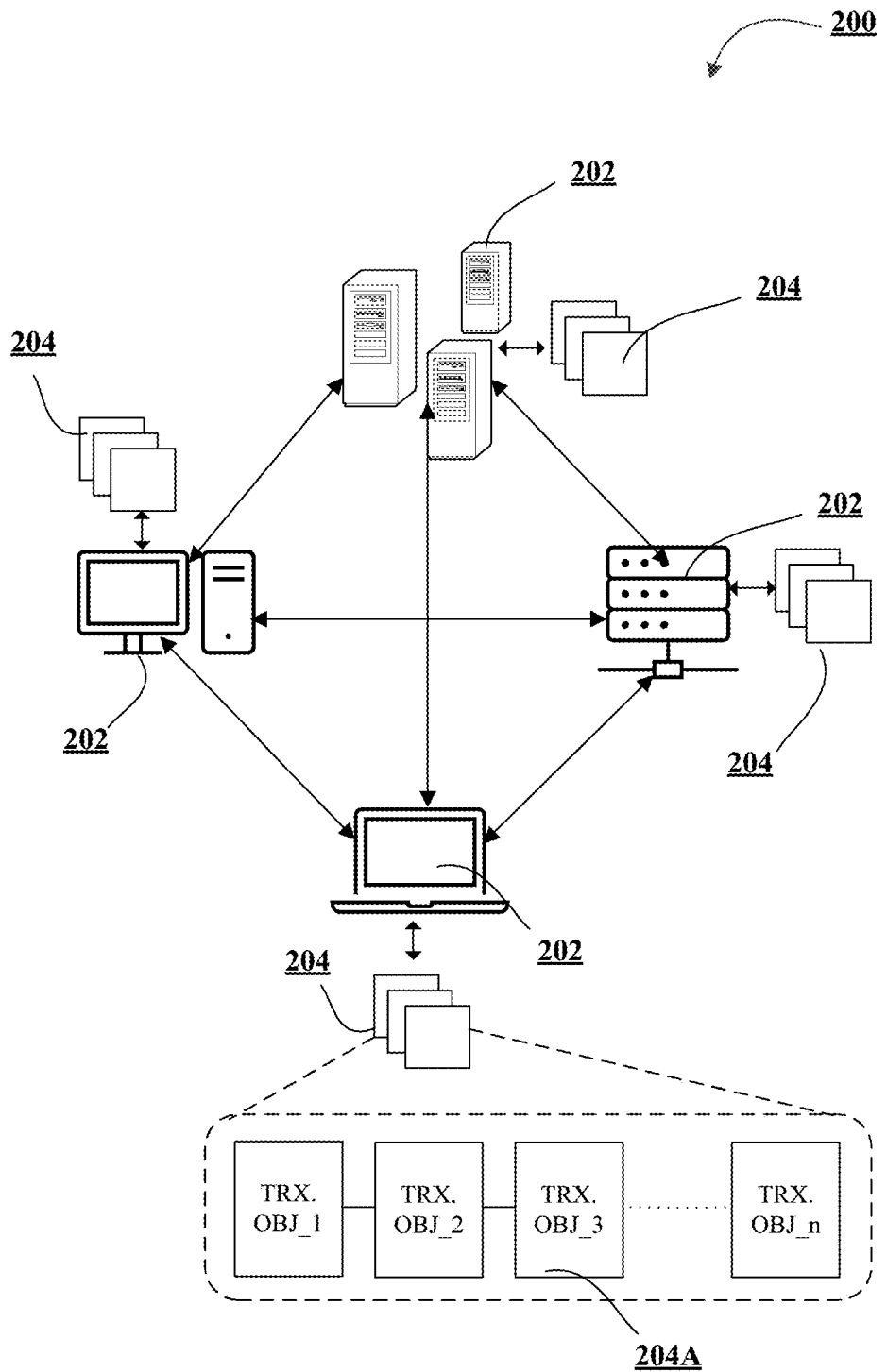
Figure 2B:
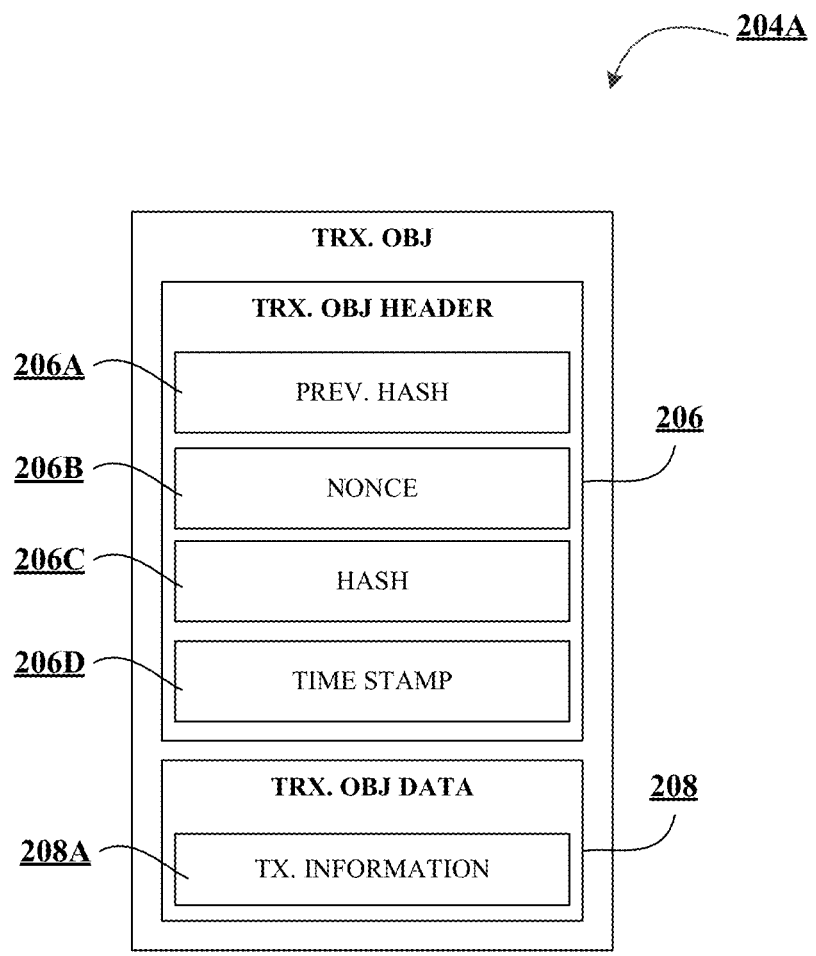
Figure 3A:
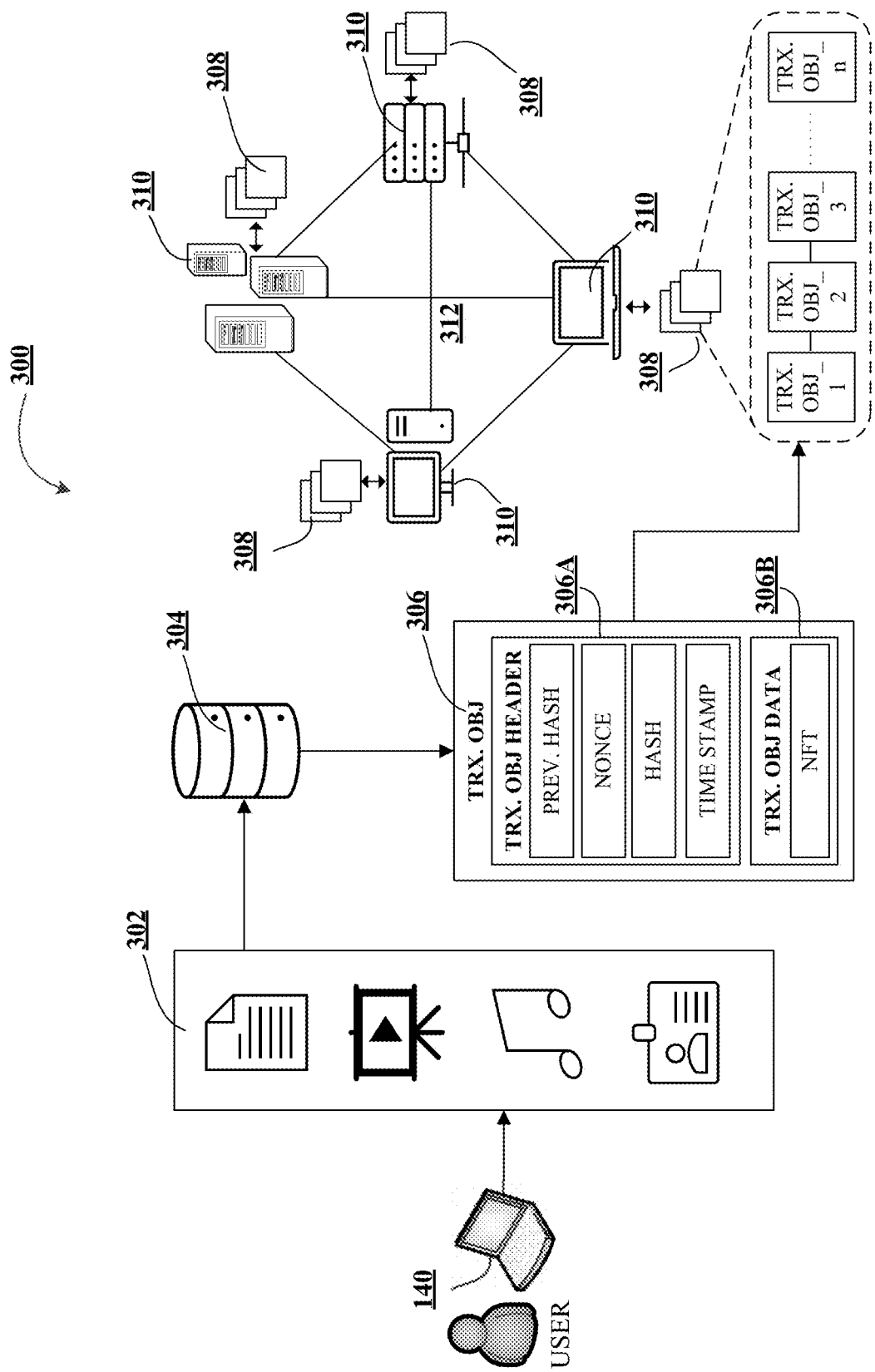
Figure 3B:
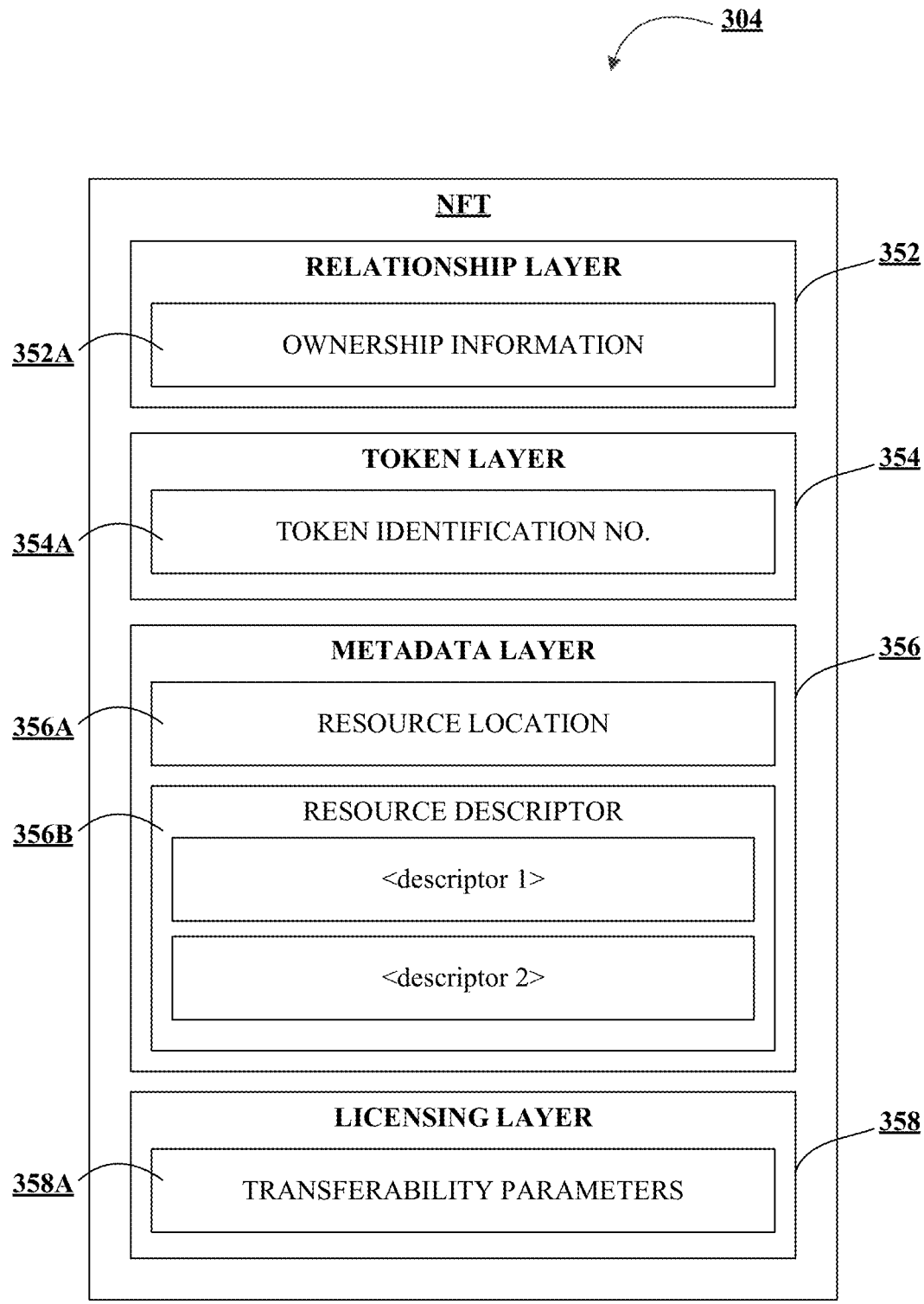
Figure 4:
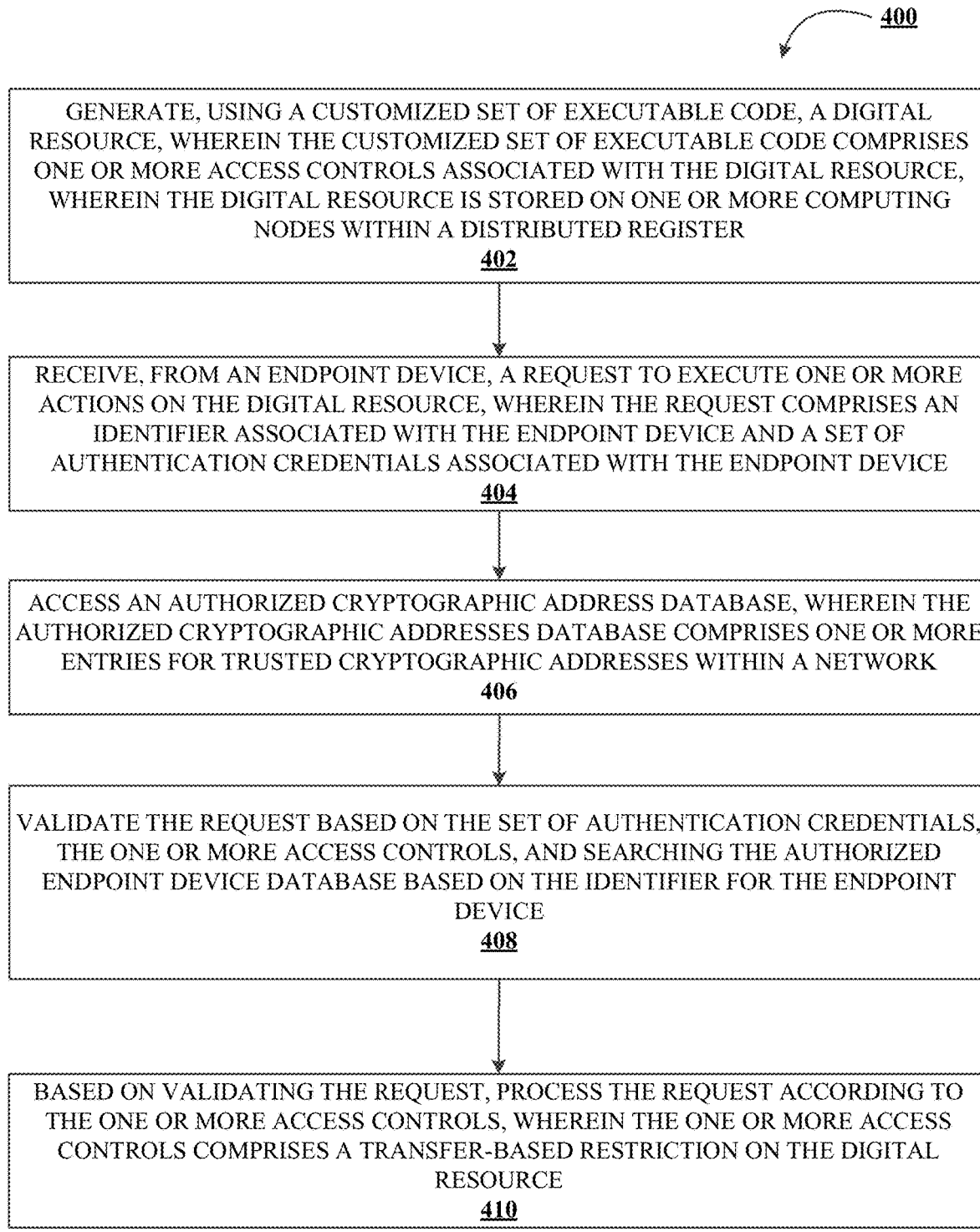
Figure 5:
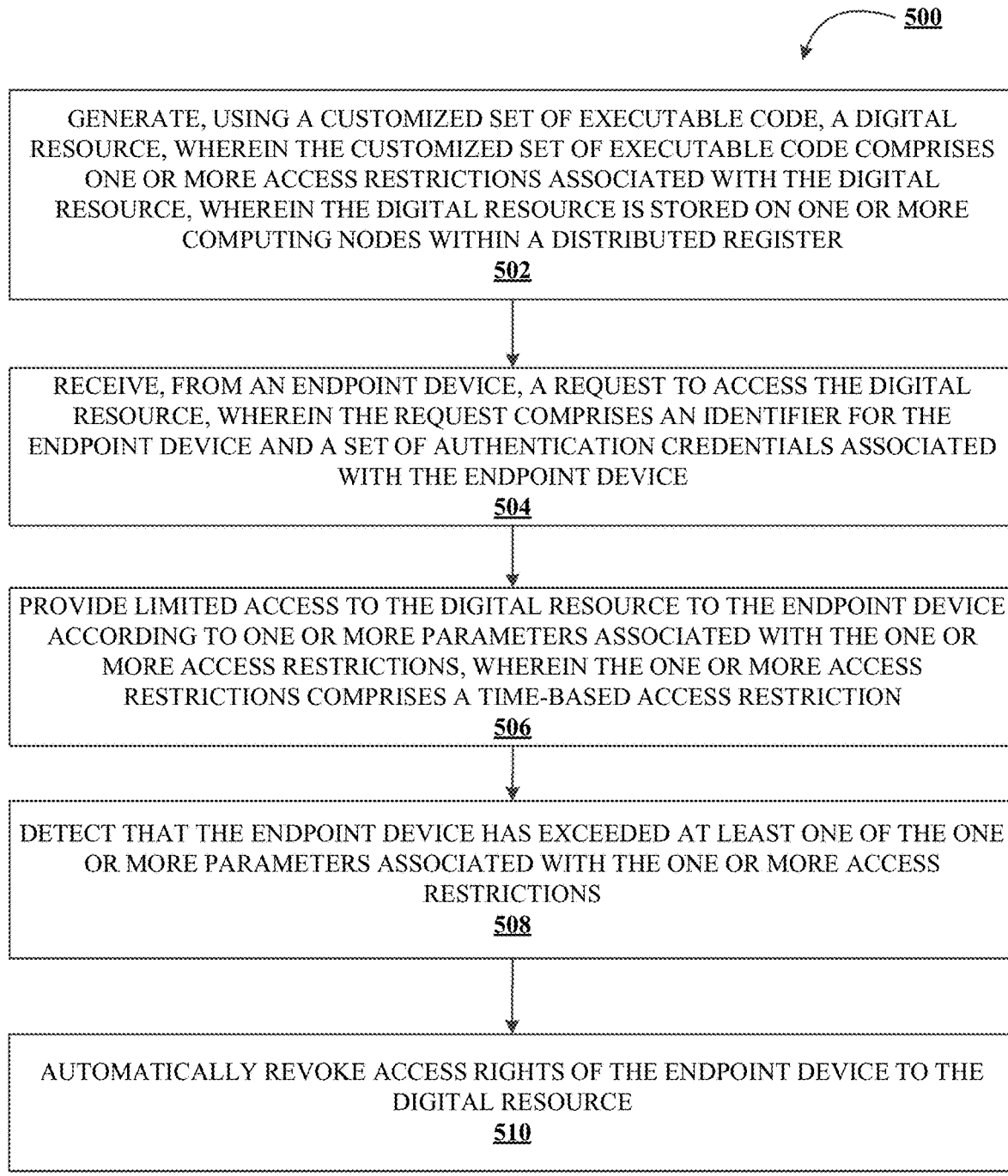

Having thus described embodiments of the invention in general terms, reference will now be made the accompanying drawings, wherein:

FIGS. 1A-1C illustrates technical components of an exemplary distributed computing environment for the system for implementing transfer and access restrictions on electronic digital resources, in accordance with an embodiment of the present disclosure;

FIG. 2A illustrates an exemplary DLT architecture, in accordance with an embodiment of the present disclosure;

FIG. 2B illustrates an exemplary transaction object, in accordance with an embodiment of the present disclosure;

FIG. 3A illustrates an exemplary process of creating an NFT 300, in accordance with an embodiment of the present disclosure; and FIG. 3B illustrates an exemplary NFT 304 as a multi-layered documentation of a resource, in accordance with an embodiment of the present disclosure;

FIG. 4 illustrates a process flow for implementing transfer and access restrictions on electronic digital resources, in accordance with an embodiment of the present disclosure; and FIG. 5 illustrates a process flow for implementing time-restricted access control to electronic digital resources, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "computing resource" or "resource" may generally refer to physical and/or virtual components or materials that are used in the operation of a computing device. Accordingly, examples of such resources may include processing power, memory allocation, cache space, storage space, data files, network connections and/or bandwidth, electrical power, input/output functions, and the like. Resources stored in a digital format (e.g., data records) may be referred to as "digital resources."

"Cryptographic function" or "cryptographic algorithm" as used herein may refer to a set of logical and/or mathematical operations or processes that may be executed on a specified segment of data to produce a cryptographic output (or "cypher"). In some embodiments, the cryptographic algorithm may be an algorithm such as Rivest-Shamir-Adleman ("RSA"), Shamir's Secret Sharing ("SSS"), or the like. In other embodiments, the cryptographic algorithm may be a hash algorithm which may, given a specified data input, produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

As used herein, "non-fungible token" or "NFT" may be a digital resource which may be uniquely linked to a particular resource. An NFT may typically be stored on a distributed register that certifies ownership and authenticity of the resource, and exchangeable in a peer-to-peer network.

Digital resources such as NFTs may be stored within a network environment and used for a number of different purposes. For instance, an NFT may encapsulate digital files or media such as video, image, and/or audio data. Each NFT may be associated with a cryptographic address that may be associated with a user, who may be assigned a unique private key signifying ownership of the NFT. In this regard, the user may be required to input the private key to take certain actions with respect to the NFT, such as accessing the media data referenced in the NFT, transferring ownership of the NFT, or the like. That said, there is a need for a way to prevent unauthorized use of the NFT's and/or the digital files associated therewith.

Accordingly, the system provides a way to generate NFTs with integrated access restrictions. In this regard, the system may create (or "mint") an NFT using a customized set of executable code (e.g., a "smart contract"), where the smart contract may specify one or more access controls for use with the NFT. In one embodiments, the smart contract may specify an access control that sets the NFT to be non-transferable after an initial ownership of the NFT is established. In this regard, once the owner ID of the NFT (e.g., a distributed register address) is identified and set, the access control for the NFT may be activated. Subsequently, if the user who owns the NFT attempts to transfer ownership of the NFT (e.g., assign ownership of the NFT to a new distributed register address), the system may automatically block the ownership of the NFT from being transferred.

In another embodiment, the smart contract may restrict transfer of the NFT to authorized recipients. In this regard, the system may maintain a database of users who have been onboarded as authorized users. For instance, the system may require that the users provide certain authentication credentials (e.g., biographical information, identifying documents or other types of information, usernames and/or passwords, and the like). Each of the entries within the database may be uniquely associated with a cryptographic address (e.g., a distributed register address). Upon detecting a request for transfer of ownership of the NFT, the system may access the database of authorized users. Based on the identified recipient within the request to transfer ownership of the NFT, the system may search the database to determine whether the identified recipient is a trusted (and thus eligible) recipient of ownership of the NFT. If a match is detected, the system may allow the transfer of the ownership. However, if no match is detected, the system may automatically block the transfer from occurring. In some embodiments, the NFT may be stored in a private distributed register in which only authorized participants may access and/or perform functions within the distributed register (e.g., access data records, perform validation of data records, participate in consensus, and the like). In such embodiments, the transfer of NFTs may be limited to users and/or endpoint devices that may be authorized to participate in transactions on the private distributed register.

Embodiments of the present disclosure also provide for a system and method for implementing time-restricted access control to electronic digital resources. In this regard, an owner of an NFT may, rather than transferring ownership, wish to provide limited access to one or more authorized users to the NFT and/or the digital data associated therewith. To this end, the smart contract may specify one or more access controls or restrictions on the NFT and/or the digital data associated with the NFT, such as restrictions on access time duration, number of times the NFT can be accessed, how many users may concurrently access the NFT, whether authorized users may permit other users to also view the NFT, and whether users may view the NFT anonymously (e.g., without revealing the user's identity to other users). For instance, an NFT may be uniquely associated with a media file such as an image file, audio file, video file, document file, or the like. Accordingly, the access limitations placed on the digital data may be dependent on the type of digital data with which the NFT is associated. In embodiments in which the digital data is an image file, the access limitations may include a time restriction (e.g., the user may only view the image file for a fixed length of time, such as 5 minutes), resolution-based restrictions (e.g., the image file displays at half of the full resolution), watermark-based restrictions (e.g., a digital watermark is overlayed on the image), and/or the like. In embodiments in which the digital data is a video, audio, or document file, the access limitations may include any of the limitations described above and/or other limitations, such as segment-based restrictions (e.g., the authorized user is only able to access a certain segment of the file, such as a certain timeframe of a video or audio file or certain pages of a document file).

In an exemplary embodiment, a user (e.g., an owner of an NFT) may wish to provide limited access to the NFT to other users (e.g., potential recipients of a transfer of the NFT), where the NFT is uniquely linked to a data file such as an image (e.g., a digital painting). To this end, the user may access an online dashboard that may be connected to the distributed register on which the NFT is stored, where the online dashboard may comprise user interface elements through which the user may publish the NFT and the digital data file (or "digital object") associated with the NFT for restricted access viewing. Upon receiving a request from a user to view the NFT and/or the digital object, the system may require that the user provide authentication credentials (e.g., a private key), be associated with a user ID that appears within the authorized user database, and/or be permitted to access a private distributed register on which the NFT may be stored.

The access of the NFT by the one or more authorized users may be restricted according to the parameters set within the smart contract associated with the NFT. For instance, the smart contract may specify that users may view the image file for 10 minutes and/or a total number of 5 times per user. Once the user has exceeded the scope of the access rights (or in some embodiments, before the scodetepe has been exceeded), the system may prompt the user to initiate a transfer of the NFT (e.g., the user may purchase the NFT for a designated amount of resources, such as a cryptocurrency). In response to the prompt, the user may submit a request to transfer the NFT to a cryptographic address associated with the user. Upon receiving the request, the system may validate the request (e.g., through a consensus achieved by the nodes which host the distributed register on which the NFT is stored). In such embodiments, validating the request may include steps such as determining that the cryptographic address is associated with an adequate amount of resources for the transfer of the NFT, that the user is an authorized user and/or recipient of the NFT, that the access restrictions associated with the NFT allow the NFT to be transferred, and/or the like. Once the request has been validated, the system may append the data record associated with the request to the distributed register. Upon detecting that the data record has been added, the smart contract logic associated with the NFT may automatically revoke access rights to other users who may be viewing the NFT and/or block future requests to access the NFT from unauthorized users (e.g., users without the private key associated with the cryptographic address designated as the owner of the NFT).

The present disclosure provides a technical solution to the technical problem of controlling access to digital resources. Specifically, the technical solution presented herein provides a way to securely limit the transfer of digital resources to authorized users and/or devices, thereby preventing misuse of the digital resources. Furthermore, the system provides a way to grant limited access to the digital resources in an efficient and secure manner.

FIGS. 1A-1C illustrate technical components of an exemplary distributed computing environment 100 for the system for cryptographic hash-based reconstruction of electronic data files, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger (which may also be referred to herein as a "distributed register") of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B—a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3A illustrates an exemplary process of creating an NFT 300, in accordance with an embodiment of the invention. As shown in FIG. 3A, to create or "mint" an NFT, a user (e.g., NFT owner) may identify, using a user input device 140, resources 302 that the user wishes to mint as an NFT. Typically, NFTs are minted from digital objects that represent both tangible and intangible objects. These resources 302 may include a piece of art, music, collectible, videos, real-world items such as artwork and real estate, or any other presumed valuable object. These resources 302 are then digitized into a proper format to produce an NFT 304. The NFT 304 may be a multi-layered documentation that identifies the resources 302 but also evidences various transaction conditions associated therewith, as described in more detail with respect to FIG. 3A.

To record the NFT in a distributed ledger, a transaction object 306 for the NFT 304 is created. The transaction object 306 may include a transaction header 306A and a transaction object data 306B. The transaction header 306A may include a cryptographic hash of the previous transaction object, a nonce—a randomly generated 32-bit whole number when the transaction object is created, cryptographic hash of the current transaction object wedded to the nonce, and a time stamp. The transaction object data 306B may include the NFT 304 being recorded. Once the transaction object 306 is generated, the NFT 204 is considered signed and forever tied to its nonce and hash. Once generated, the transaction object 306 is then deployed in the distributed ledger 308. At this time, a distributed ledger address is generated for the transaction object 306, i.e., an indication of where it is located on the distributed ledger 308 and captured for recording purposes. Once deployed, the NFT 304 is linked permanently to its hash and the distributed ledger 308, and is considered recorded in the distributed ledger 308, thus concluding the minting process As shown in FIG. 3A, the distributed ledger 308 may be maintained on multiple devices (nodes) 310 that are authorized to keep track of the distributed ledger 308. For example, these nodes 310 may be computing devices such as system 130 and client device(s) 130. One node 310 may have a complete or partial copy of the entire distributed ledger 308 or set of transactions and/or transaction objects on the distributed ledger 308. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 3B illustrates an exemplary NFT 304 as a multi-layered documentation of a resource, in accordance with an embodiment of an invention. As shown in FIG. 3B, the NFT may include at least relationship layer 352, a token layer 354, a metadata layer 356, and a licensing layer 358. The relationship layer 352 may include ownership information 352A, including a map of various users that are associated with the resource and/or the NFT 304, and their relationship to one another. For example, if the NFT 304 is purchased by buyer B1 from a seller S1, the relationship between B1 and S1 as a buyer-seller is recorded in the relationship layer 352. In another example, if the NFT 304 is owned by O1 and the resource itself is stored in a storage facility by storage provider SP1, then the relationship between O1 and SP1 as owner-file storage provider is recorded in the relationship layer 352. The token layer 354 may include a token identification number 354A that is used to identify the NFT 304. The metadata layer 356 may include at least a file location 356A and a file descriptor 356B. The file location 356A may provide information associated with the specific location of the resource 302. Depending on the conditions listed in the smart contract underlying the distributed ledger 308, the resource 302 may be stored on-chain, i.e., directly on the distributed ledger 308 along with the NFT 304, or off-chain, i.e., in an external storage location. The file location 356A identifies where the resource 302 is stored. The file descriptor 356B may include specific information associated with the source itself 302. For example, the file descriptor 356B may include information about the supply, authenticity, lineage, provenance of the resource 302. The licensing layer 358 may include any transferability parameters 358B associated with the NFT 304, such as restrictions and licensing rules associated with purchase, sale, and any other types of transfer of the resource 302 and/or the NFT 304 from one person to another. Those skilled in the art will appreciate that various additional layers and combinations of layers can be configured as needed without departing from the scope and spirit of the invention.

FIG. 4 illustrates a process flow 400 for implementing transfer and access restrictions on electronic digital resources, in accordance with an embodiment of the present disclosure. The process begins at block 402, where the system generates, using a customized set of executable code, a digital resource, wherein the customized set of executable code comprises one or more access controls associated with the digital resource, wherein the digital resource is stored on one or more computing nodes within a distributed register. In this regard, in some embodiments, the digital resource may be an NFT stored within the distributed register and the executable code may be a smart contract for generating the NFT subject to the one or more access controls.

The process continues to block 404, where the system receives, from an endpoint device, a request to execute one or more actions on the digital resource, wherein the request comprises an identifier associated with the endpoint device and a set of authentication credentials associated with the endpoint device. In some embodiments, the identifier may be a cryptographic address associated with the endpoint device and/or the user of the endpoint device. In such embodiments, the authentication credentials may include a data record that has been signed using a private key uniquely associated with the cryptographic address. The one or more actions may include a transfer of ownership of the NFT from an owner to a recipient. In this regard, the action may include changing the owner parameter associated with the NFT from a first cryptographic address to a second cryptographic address.

The process continues to block 406, where the system accesses an authorized cryptographic address database, wherein the authorized cryptographic addresses database comprises one or more entries for trusted cryptographic addresses within a network. The cryptographic addresses may in some embodiments be distributed register addresses which uniquely identify a participant in the DLT network. Accordingly, the distributed register addresses may be cryptographic hash values that may identify owners and/or recipients of digital resources stored on the distributed register.

The process continues to block 408, where the system validates the request based on the set of authentication credentials, the one or more access controls, and searching the authorized endpoint device database based on the identifier for the endpoint device.

The process concludes at block 410, where the system, based on validating the request, processes the request according to the one or more access controls, wherein the one or more access controls comprises a transfer-based restriction on the digital resource.

The one or more access controls may include a transfer-based restriction on the NFT. Accordingly, in an exemplary embodiment, the transfer-based restriction may prevent the NFT from being transferred (e.g., the smart contract causes the NFT to be a non-transferrable NFT). In such embodiments, the system may receive a request from an endpoint device to transfer ownership of the NFT from an owner to a recipient. Accordingly, validating and/or processing the request may comprise automatically blocking the transfer of the NFT based on the transfer-based restriction (e.g., by causing the request to be rejected from being appended to the distributed register).

In other embodiments, the transfer-based restriction may include a limitation that restricts transfer of ownership to only authorized or trusted users and/or endpoint devices. In such embodiments, validating the request may comprise detecting a match between an identifier associated with the recipient (e.g., a cryptographic address associated with the recipient) and an entry within the authorized cryptographic address database. Upon detecting the match, the system may consider the recipient to be a trusted recipient and processing the request may comprise authorizing the transfer of the NFT to the recipient. In other embodiments, validating the request may comprise verifying that the endpoint device is authorized to access a private distributed register on which the NFT is stored (e.g., by validating the authentication credentials associated with the endpoint device). If the system is unable to validate the request (e.g., the system detects that the request is invalid because the endpoint device and/or the recipient address is unauthorized or untrusted), processing the request may comprise automatically blocking the transfer of ownership of the NFT.

FIG. 5 illustrates a process flow 500 for implementing time-restricted access control to electronic digital resources, in accordance with one embodiment of the present disclosure. The process begins at block 502, where the system generates, using a customized set of executable code, a digital resource, wherein the customized set of executable code comprises one or more access restrictions associated with the digital resource, wherein the digital resource is stored on one or more computing nodes within a distributed register. The digital resource may be, for instance, an NFT generated using a smart contract. In this regard, the one or more access restrictions may comprise one or more types of restrictions on accessing the digital resource. Examples of such restrictions may include time-based restrictions (duration of time for which the digital resource may be accessed), frequency-based restrictions (e.g., the number of times that the digital resource may be accessed), content-based restrictions (e.g., what portion of the digital resource may be accessed, at what resolution the digital resource may be viewed, or the like), and/or the like.

The process continues to block 504, where the system receives, from an endpoint device, a request to access the digital resource, wherein the request comprises an identifier for the endpoint device and a set of authentication credentials associated with the endpoint device. The identifier for the endpoint device may include, for instance, a cryptographic address associated with the endpoint device. In this regard, the authentication credentials may include credentials such as a username and password, digitally signed data record (e.g., using a private key associated with the cryptographic address), or the like. In some embodiments, the authentication credentials may be the credentials used by the endpoint device to gain authorized access to the private DLT network on which the digital resource is stored.

The process continues to block 506, where the system provides limited access to the digital resource to the endpoint device according to one or more parameters associated with the one or more access restrictions, wherein the one or more access restrictions comprises a time-based access restriction. The parameters may be set according to the access restriction to which the parameters may relate. For instance, a parameter for a time-based access restriction may be a duration (e.g., in seconds or minutes) or frequency (e.g., number of times) limit that applies to the digital resource that may be accessed by a particular endpoint device, user, and/or cryptographic address. Content-based parameters may include, for instance, a resolution and/or bitrate of an audio or video file, the specific pages or sections of a document that are available for viewing, certain pixels that are viewable in an image file, watermarks and/or sound marks, and/or the like.

The process continues to block 508, where the system detects that the endpoint device has exceeded at least one of the one or more parameters associated with the one or more access restrictions. In an exemplary embodiment, a duration parameter for a time-based access restriction may be set to 5 minutes, and a frequency parameter may be set to 4 times. In such an embodiment, if any individual endpoint device views the digital resource for longer than 5 minutes or accesses the digital resource more than 4 times, the system may consider the endpoint device to have exceeded a parameter associated with the access restrictions (e.g., the time-based access restriction).

The process concludes at block 510, where the system automatically revokes access rights of the endpoint device to the digital resource. In this regard, the system may block the digital resource from being displayed on the endpoint device and may further cause a notification to be displayed on the endpoint device, where the notification may be a prompt to initiate a transfer of ownership of the digital resource (e.g., a prompt to purchase the NFT). In such embodiments, the notification may comprise an interactive link that, when activated by the user, may cause the endpoint device to transmit a request to transfer ownership of the digital resource from the current owner to a cryptographic address associated with the endpoint device. The system may validate the request according to one or more validation criteria, which may include checks to verify that the cryptographic address contains an adequate amount of resources for the transfer, that the cryptographic address is an eligible recipient (e.g., the cryptographic address is trusted), and/or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for implementing time-restricted access control to electronic digital resources, the system comprising:
    at least one non-transitory storage device; and
    at least one processor coupled to the at least one non-transitory storage device, wherein the at least one processor is configured to:
        generate, using a customized set of executable code, a digital resource, wherein the customized set of executable code comprises one or more access restrictions associated with the digital resource, wherein the digital resource is stored on one or more computing nodes within a distributed register;
        receive, from an endpoint device, a request to access the digital resource, wherein the request comprises an identifier for the endpoint device and a set of authentication credentials associated with the endpoint device including a cryptographic address associated with the endpoint device;
        provide limited access to the digital resource to the endpoint device according to one or more parameters associated with the one or more access restrictions, wherein the one or more access restrictions comprises a time-based access restriction and a frequency-based access restriction;
        detect that the endpoint device has exceeded at least one of the one or more parameters associated with the one or more access restrictions;
        transmit a notification comprising an interactive link to the endpoint device, wherein the interactive link, upon selection, causes the endpoint device to transmit a request to a cryptographic address associated with the endpoint; and
        automatically revoke access rights of the endpoint device to the digital resource when interactive link is not selected.

2. The system of claim 1, wherein the time-based access restriction comprises a duration-based restriction, wherein the one or more parameters comprises a duration parameter for specifying a time limit for accessing the digital resource.

3. The system of claim 2, wherein detecting that the endpoint device has exceeded at least one of the one or more parameters comprises detecting that a time elapsed for endpoint device accessing the digital resource has exceeded a time limit specified by the duration parameter.

4. The system of claim 1, wherein the frequency-based access restriction comprises a frequency parameter for defining a number of times that the digital resource may be accessed by the endpoint device.

5. The system of claim 4, wherein detecting that the endpoint device has exceeded at least one of the one or more parameters comprises detecting that a number of times that the endpoint device has accessed the digital resource has exceeded a frequency limit specified by the frequency parameter.

6. The system of claim 1, wherein the one or more access restrictions further comprises a content-based access restriction, wherein the one or more parameters comprises at least one of a resolution parameter or bitrate parameter.

7. The system of claim 1, wherein revoking the access rights of the endpoint device comprises blocking future access requests from the endpoint device.

8. A computer program product for implementing time-restricted access control to electronic digital resources, the computer program product comprising a non-transitory computer-readable medium comprising code causing an apparatus to:
    generate, using a customized set of executable code, a digital resource, wherein the customized set of executable code comprises one or more access restrictions associated with the digital resource, wherein the digital resource is stored on one or more computing nodes within a distributed register;
    receive, from an endpoint device, a request to access the digital resource, wherein the request comprises an identifier for the endpoint device and a set of authentication credentials associated with the endpoint device including a cryptographic address associated with the endpoint device;
    provide limited access to the digital resource to the endpoint device according to one or more parameters associated with the one or more access restrictions, wherein the one or more access restrictions comprises a time-based access restriction and a frequency-based access restriction;
    detect that the endpoint device has exceeded at least one of the one or more parameters associated with the one or more access restrictions;
    transmit a notification comprising an interactive link to the endpoint device, wherein the interactive link, upon selection, causes the endpoint device to transmit a request to a cryptographic address associated with the endpoint; and
    automatically revoke access rights of the endpoint device to the digital resource when interactive link is not selected.

9. The computer program product of claim 8, wherein the time-based access restriction comprises a duration-based restriction, wherein the one or more parameters comprises a duration parameter for specifying a time limit for accessing the digital resource.

10. The computer program product of claim 9, wherein detecting that the endpoint device has exceeded at least one of the one or more parameters comprises detecting that a time elapsed for endpoint device accessing the digital resource has exceeded a time limit specified by the duration parameter.

11. The computer program product of claim 8, wherein the frequency-based access restriction comprises a frequency parameter for defining a number of times that the digital resource may be accessed by the endpoint device.

12. The computer program product of claim 11, wherein detecting that the endpoint device has exceeded at least one of the one or more parameters comprises detecting that a number of times that the endpoint device has accessed the digital resource has exceeded a frequency limit specified by the frequency parameter.

13. The computer program product of claim 8, wherein the one or more access restrictions further comprises a content-based access restriction, wherein the one or more parameters comprises at least one of a resolution parameter or bitrate parameter.

14. A computer-implemented method for implementing time-restricted access control to electronic digital resources, the computer-implemented method comprising:
- generating, using a customized set of executable code, a digital resource, wherein the customized set of executable code comprises one or more access restrictions associated with the digital resource, wherein the digital resource is stored on one or more computing nodes within a distributed register;
- receiving, from an endpoint device, a request to access the digital resource, wherein the request comprises an identifier for the endpoint device and a set of authentication credentials associated with the endpoint device including a cryptographic address associated with the endpoint device;
- providing limited access to the digital resource to the endpoint device according to one or more parameters associated with the one or more access restrictions, wherein the one or more access restrictions comprises a time-based access restriction and a frequency-based access restriction;
- detecting that the endpoint device has exceeded at least one of the one or more parameters associated with the one or more access restrictions;
- transmitting a notification comprising an interactive link to the endpoint device, wherein the interactive link, upon selection, causes the endpoint device to transmit a request to a cryptographic address associated with the endpoint; and
- automatically revoking access rights of the endpoint device to the digital resource when interactive link is not selected.

15. The computer-implemented method of claim 14, wherein the time-based access restriction comprises a duration-based restriction, wherein the one or more parameters comprises a duration parameter for specifying a time limit for accessing the digital resource.

16. The computer-implemented method of claim 15, wherein detecting that the endpoint device has exceeded at least one of the one or more parameters comprises detecting that a time elapsed for endpoint device accessing the digital resource has exceeded a time limit specified by the duration parameter.

17. The computer-implemented method of claim 14, frequency-based access restriction comprises a frequency parameter for defining a number of times that the digital resource may be accessed by the endpoint device.

18. The computer-implemented method of claim 17, wherein detecting that the endpoint device has exceeded at least one of the one or more parameters comprises detecting that a number of times that the endpoint device has accessed the digital resource has exceeded a frequency limit specified by the frequency parameter.

19. The computer-implemented method of claim 14, wherein the one or more access restrictions further comprises a content-based access restriction, wherein the one or more parameters comprises at least one of a resolution parameter or bitrate parameter.

20. The computer-implemented method of claim 14, wherein revoking the access rights of the endpoint device comprises blocking future access requests from the endpoint device.

* * * * *